April 16, 1940.   A. KOLB ET AL   2,197,308
MACHINE TOOL
Filed April 22, 1938   4 Sheets-Sheet 1

Inventors
Alfred Kolb
Wilhelm Wilk by
Attorney

Inventors
Alfred Kolb
Wilhelm Wilk by [signature]
Attorney

April 16, 1940.  A. KOLB ET AL  2,197,308
MACHINE TOOL
Filed April 22, 1938  4 Sheets-Sheet 3
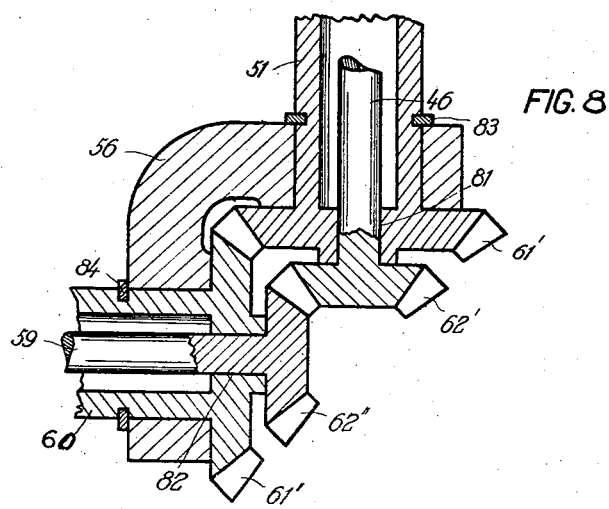
FIG. 8
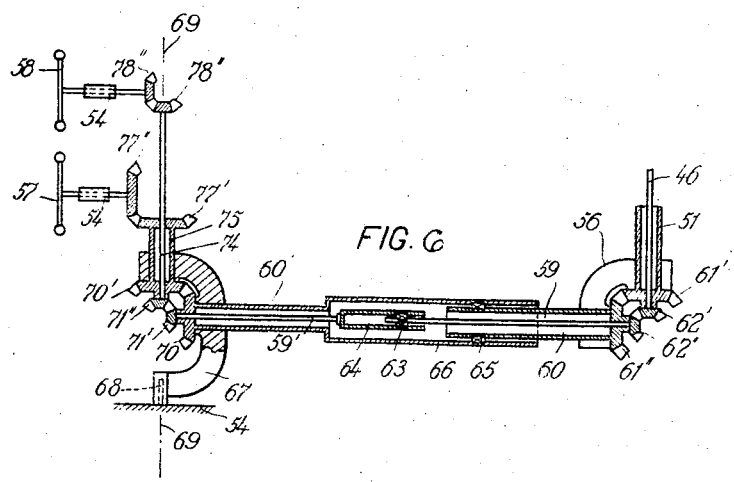
FIG. 6
FIG. 7
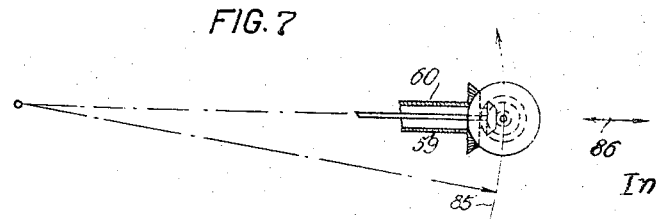
Inventors
Alfred Kolb
Wilhelm Wilk
by
Attorney April 16, 1940.　　　A. KOLB ET AL　　　2,197,308
MACHINE TOOL
Filed April 22, 1938　　4 Sheets-Sheet 4

Inventor
Alfred Kolb
Wilhelm Wilk
By
Attorney

Patented Apr. 16, 1940

2,197,308

UNITED STATES PATENT OFFICE 2,197,308

MACHINE TOOL

Alfred Kolb and Wilhelm Wilk, Aschaffenburg, Germany

Application April 22, 1938, Serial No. 203,686
In Germany July 6, 1935

5 Claims. (Cl. 51—165)

This invention relates to machine tools, and more particularly to machine tools in which a magnified image of the cutting tool and the work piece profiles, at the point where the tool and piece profiles, engage, is produced by illumination, and checked with a diagram card.

As compared with machine tools in which the position of the tool with respect to the work piece is observed through a microscope, machine tools of the type referred to have the advantages that the operator's eye, or eyes, is not strained, and that the magnified image can be observed by several persons at the same time, for instance, by the operator himself and a boss superintending him.

It is an object of the invention to provide an improved machine tool of the type referred to.

To this end, in combination with means for holding a cutting tool and a work piece—for instance, a lathe tool and a work piece to be ground, or a grinding wheel and a flat templet to be ground by the wheel—with means for illuminating the tool and the work piece at the point where they engage, and with means for imparting relative feeding movement to the tool and the work piece in the plane of the shadow image of the profiles of the tool and the work piece which is produced by such illumination at the point where the tool and the work engage; means are provided for magnifying the image and for projecting the magnified image against a screen, for instance, a plate of ground glass, where the image is checked with a diagram card.

The illumination is preferably effected by a bundle of parallel light rays which preferably is at an angle of 90 degs. to the plane of the feeding movement. By these means, the profiles of the tool and the work piece, viewed from that side which is opposite the source of illuminating—and preferably parallel—light, are clearly defined. The shadow image of the profiles is projected onto a screen, such as a pane of ground glass, arranged preferably at right angles to the direction of the light, and enlarged, as required for exact checking of the profiles, and exact machining of the work piece, by an objective arranged at the rear of the pane, as viewed from the tool and the work. The magnified image is projected against the other screen already referred to where it is checked, as described.

Other objects of the invention will appear from the following specification, with reference to the accompanying drawings in which several embodiments of the invention are illustrated more or less diagrammatically by way of example.

In the drawings

Fig. 6 is a sectional diagrammatic elevation of a mechanism for operating a pair of driving shafts forming part of the combination illustrated in Figs. 4 and 5.

Fig. 7 is a part plan view of Fig. 6.

Fig. 8 is a detail showing the connection of the mechanism to the driving shafts in section and drawn to a larger scale.

Figure 1:
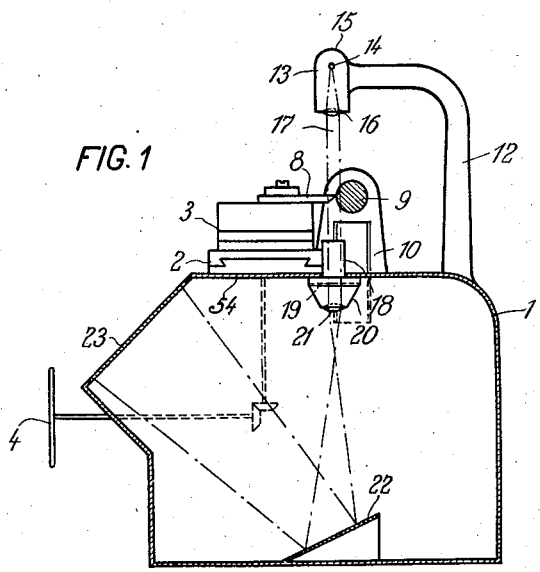
Fig. 1 is a diagrammatic elevation.
Figure 2:
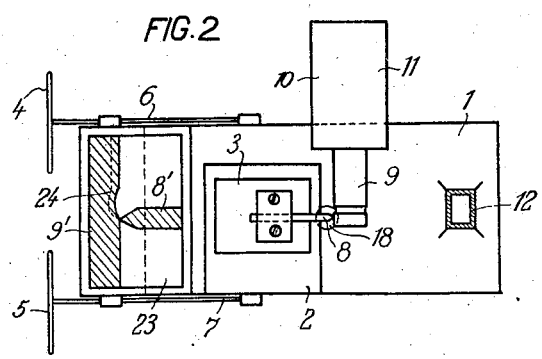
Fig. 2 is a diagrammatic plan view, partly in section, of a precision lathe where the image of the profiles is magnified by an objective at the rear of the ground glass pane.

Referring now to the drawings, and first to Figs. 1 and 2, this precision lathe is equipped with a foundation frame, or casing, 1 resembling a box. An upper cross slide 3, and a lower cross slide 2, are mounted on the top plate 54 of the box 1, and the upper cross slide 3 supports a lathe tool 8. The slides are operated by hand wheels 4 and 5 on control shafts 6 and 7, respectively. The control mechanism is illustrated only diagrammatically in Figs. 1 and 2 and is shown with the control shafts arranged at opposite sides of the box 1. A control mechanism equipped with a pair of coaxially arranged control shafts will be described with reference to Figs. 6 to 10. A work piece 9 is mounted to rotate in a head stock 10, and is driven by a motor 11.

Cast integral with, or secured to, the box 1 is an angular upright 12 with a lamp 13 at the end of its horizontal arm. A source of light 14, normally an incandescent lamp, is arranged in the cowl 13 and positioned vertically above the point where the tool 8 engages the work piece 9. The source of light is surrounded by a reflector 15 and its rays are collected and directed toward the said point as a bundle 17 of parallel rays, by a lens 16 at the lower end of the lamp 13. The profiles of the tool 8 and the work piece 9 are so illuminated by the bundle 17 that they appear clearly defined if viewed against the lamp 13, i. e., from below in Fig. 1.

Inserted in a hole of the top plate 54 is the tubular upper end 18 of a camera 20. The shadow image of the profiles appears in its own size, i. e., without magnification, on a screen 19, normally a ground glass plate, in the camera 20. Arranged at the rear of the screen 19, as viewed from the lamp 13, or below the screen, as arranged in Fig. 1, is a magnifying objective 21 which projects the image onto an inclined mirror 22 at the bottom of the box 1, and the mirror reflects the image against an inclined screen 23 which may also be a pane of ground glass, and is arranged in a convenient position for observation by the operator. In Fig. 2, the profile 8' of the tool 8, and the profile 9' of the work piece, are indicated by the shaded areas. A drawing, or diagram card whose contour is indicated by the dotted line 24 in Fig. 2, is secured to the inclined screen 23 by suitable means, not shown. This diagram card is drawn to the same scale as the magnified profile image. In Fig. 2, the right-hand portion of the work piece 9 has already been machined to size and the operator now begins on the left-hand portion which he must turn down as far as the dotted line 24.

If desired, the interengaging parts, i. e., the tool and the work piece, may be exchanged, the tool 8 being replaced by a work piece, for instance, a flat templet, and the work piece 9 being replaced by a rotary tool, such as a milling cutter, or grinding wheel. It is also possible to provide guides in which the headstock 10, with the part—work piece or tool—which it supports, is shifted or reciprocated vertically in parallel relation to the bundle of parallel light rays 17.

Instead of arranging a horizontal screen 19 in the camera 20, it might be provided with an inclined screen, and with a mirror for deflecting the image to the inclined screen. The image is then magnified, as described.

Figure 3:
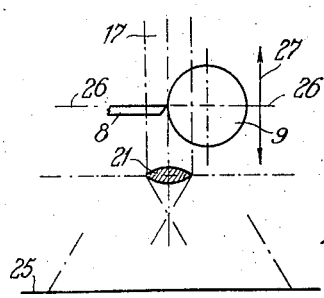
Fig. 3 is a diagram showing the magnifying objective arranged in front of the pane.

Another possibility is that of dispensing with the second screen 23, and of projecting the magnified image of the profiles directly against a large screen, like 23. An optical arrangement of this type is shown in Fig. 3 where the objective 21 whose focal plane 26—26 coincides with the plane in which the relative feeding movement of the parts 8 and 9 occurs, is placed between the point where the parts engage each other, and a large screen 25 on which the magnified image of the profiles at the point is projected.

The system which has been described, is favorable with respect to the light intensity required, as it has only one light-absorbing screen but it involves certain difficulties if one of the parts, for instance, the work piece 9, a grinding wheel, or a milling cutter replacing the work piece, is reciprocated vertically, as indicated by the arrows 27. If a bundle 17 of parallel rays projects the profile image on the screen 19, Fig. 1, and the image is then magnified, vertical movement of the part obviously has no influence on the definition of the image, but this is not so when the image is magnified before being projected on the screen, as in Fig. 3, for the outline of the part 9 is obviously sharply defined only when the axis of the part is in the focal plane 26—26.

Therefore, if light intensity is a secondary consideration, and one of the parts is reciprocated vertically, the system with the bundle 17 of parallel rays and the two screens 19 and 23, as illustrated in Figs. 1 and 2, is preferable. The tool or the work piece, or both together, may be reciprocated vertically and in parallel relation to the bundle 17, as is the rule in reciprocating grinding machines, and it does not make a difference if the distance of the part, or parts, from the plane 26—26 varies, while in the arrangement according to Fig. 3 the image of the part, or parts, lacks definition whenever the part is not in the focal plane 26—26.

It has been found that refractions of light occur at the edges of the grinding wheels, particularly those for grinding flat templets, and spoil the definition of the magnified image This drawback is eliminated by using black wheels. Preferably, the grinding wheels are blackened throughout their substance. Either a substance is used which has a black color, or it is colored black, or the binder, or binders, are black, or are colored black. Another possibility is impregnation of the wheels with black color.

Instead of placing a drawing, or diagram card, on the screen 23 or 25, the diagram may be drawn on the screen itself. The usual magnification is 50 times.

As mentioned, it is a particular advantage of the invention that the magnified image on the screen can be seen by a great number of persons at a time and without any effort or strain, as the persons are not compelled to apply their eyes to the eye piece of a microscope.

For the convenience of the operator, it is desirable that the hand wheels for adjusting the tool or the work piece through the medium of cross slides, should be positioned in a fixed position with respect to the screen on which the magnified image appears, and easily accessible.

These conditions are fulfilled in the arrangement which will now be described with reference to Figs. 4 to 9.

Figure 4:
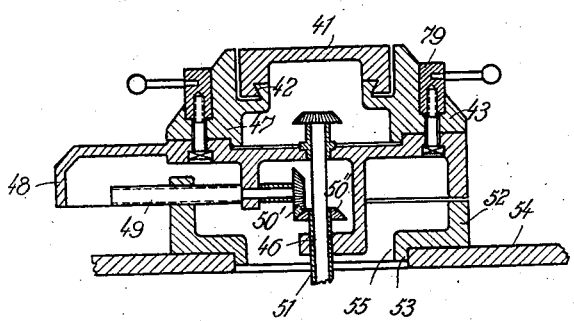
Fig. 4 is a sectional elevation of a combination of slides and rotary members for supporting the tool or the work piece.
Figure 5:
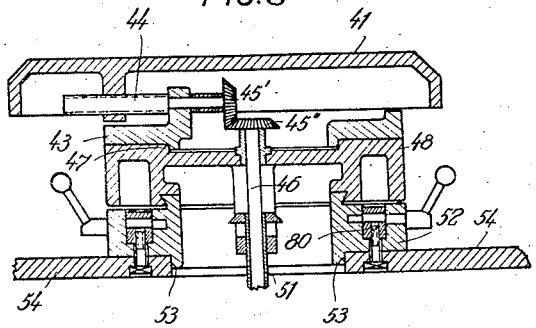
Fig. 5 is a section of the combination, taken at right angles to the section in Fig. 4, and viewed from the left in that figure.
Figure 9:
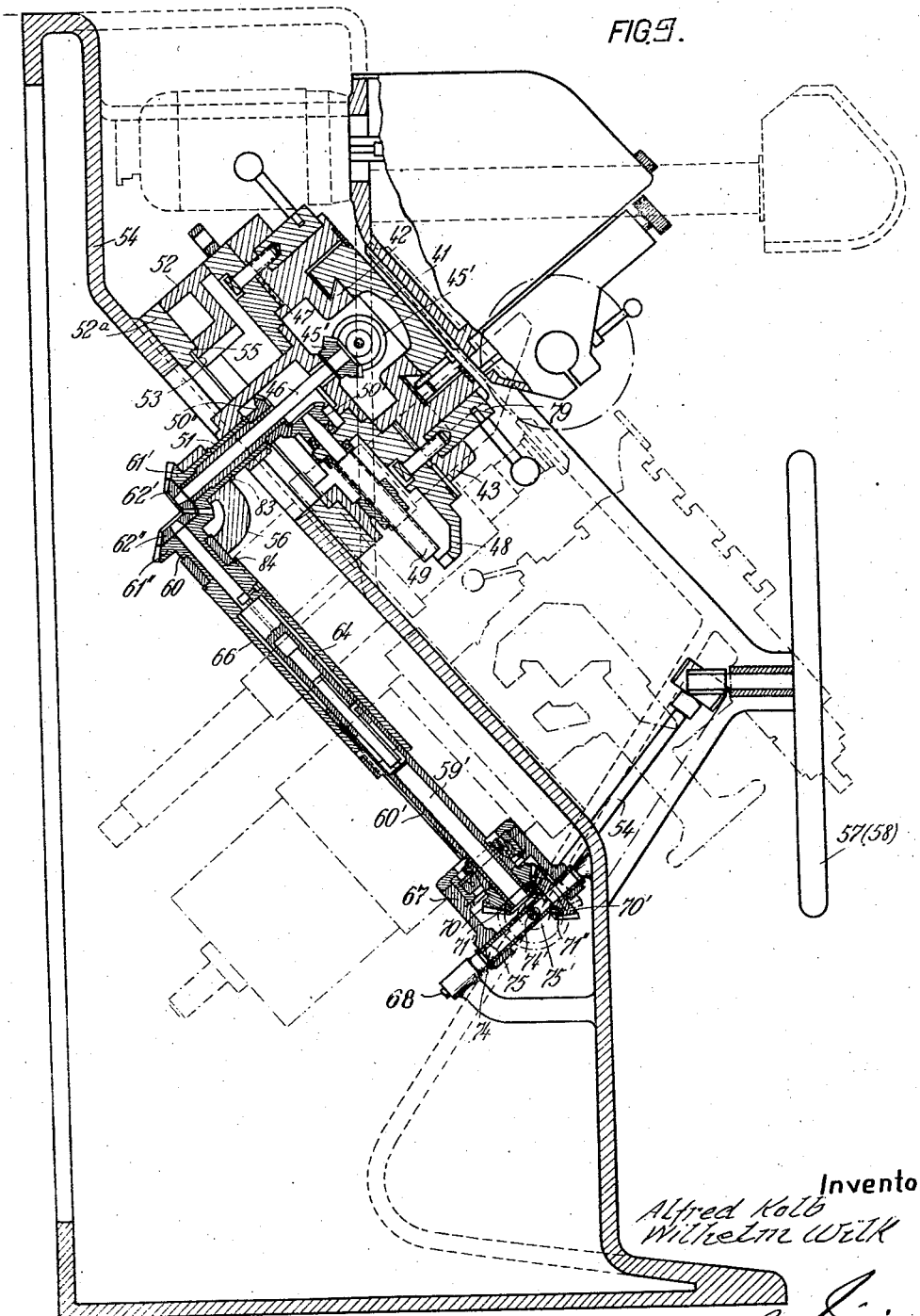
Fig. 9 is a vertical section of a complete machine.

Referring first to Figs. 4 and 5, the tool, or the work piece, is secured to the topmost slide 41 of a unit comprising, besides the top slide, an upper rotary member 43, a lower slide 48, and a lower rotary member 52.

The lower rotary member 52 is inserted in an annular bearing 52a above a hole of the top plate 54 by means of a spigot 53. The bearing 52a has been omitted in Figs. 6 and 7. The lower slide 48 is guided on the lower rotary member 52 by dove-tailed guides and supports a spindle 49 whose threaded portion engages in a female thread in a lug of the lower member. The upper rotary member 43 has a spigot 47 engaging in a recess in the top wall of the lower slide 48. The topmost slide 41 is guided in dove-tails 42 of the upper rotary member 43. This member supports a spindle 44 whose threaded portion engages in a female thread in a lug of the topmost slide. Clamping means 79 are arranged for clamping the upper rotary member 43 on the lower slide 48, and clamping means 80 are provided for clamping the lower rotary member 52 on the top plate 54. Scales or other suitable means are provided for reading the positions to which the rotary members 52 and 43 have been rotated, and the slides 48 and 41 have been shifted.

A bearing for the upper end of a driving shaft 46 is arranged in the top wall of the lower slide 48 at the center of the spigot 47 for the upper rotary member 43. The driving shaft 46 is shown vertical in Figs. 6 and 7, in combination with horizontal slides, for the sake of convenience, but in fact, as shown in Fig. 11, the shaft and the slides are arranged in planes inclined at 45 degrees. Keyed on the upper end of the driving shaft 46 is a bevel pinion 45" which meshes with a bevel pinion 45' on the spindle 44. The lower end of the driving shaft 46 is mounted to rotate in the boss of a bevel pinion 61' at the lower end of a hollow driving shaft 51 which is mounted to rotate in a bracket depending from the top plate of the lower slide 48. The shafts 46 and 51 are arranged in co-axial relation. A bevel pinion 50'' at the upper end of the hollow driving shaft meshes with a bevel pinion 50' on the spindle 49. It will appear that the two co-axial driving shafts 46 and 51 move with the lower slide 48, and this is why the opening 55 in the lower end of spigot 53 provides sufficient space.

The two driving shafts 46, 51 might be extended and equipped with hand wheels or similar means for rotating the shafts and shifting the upper and lower slides through their spindles 44 and 49. The hand wheels move with the lower slide 48 and this is not inconvenient if the distance through which the lower slide is shifted, is comparatively short. However, for longer distances the hand wheels should be arranged in fixed positions, and not travel with the lower slide. Such an arrangement is illustrated in Figs. 6, 7, and 8.

Mounted to turn on the hollow shaft 51 below its bearing in the lower slide 48 is an angular bearing bracket 56. The horizontal arm of the bracket is inserted between the back of the bevel pinion 61' at the lower end of the hollow shaft, and an annular washer 83 in a groove of the shaft. The bevel pinion 61' meshes with a bevel pinion 61'' on a hollow control shaft 60 which is mounted to rotate in the vertical arm of the bracket between the back of its bevel pinion 61'' and a washer 84 in the hollow control shaft. Mounted to rotate in the boss of the bevel pinion 61'' and in co-axial relation to the shaft 60 is a solid control shaft 59 with a bevel pinion 62'' meshing with a bevel pinion 62' on the lower end of the solid driving shaft 46. By these means, uniform transmission of rotation is effected from the solid control shaft 59 to the solid driving shaft 46, and from the hollow control shaft 60 to the hollow driving shaft 51.

The hand wheels might be placed on the front ends of the control shafts 59 and 60 but again the hand wheels would move with the lower slide 48 which, as stated, is not always desirable. The problem is to arrange the hand wheels in fixed positions at any desired point of the machine tool.

This problem is solved by making the length of the control shafts variable, as shown in Fig. 6. A spline 63 on the solid control shaft 59 engages in a groove in a sleeve 64 at the rear end of a shaft 59' which is the axial extension of the shaft 59. A similar arrangement, with a spline 65, a sleeve 66, and a hollow extension 60', is provided for the hollow driving shaft 60. The ends of the co-axially arranged extensions 59' and 60' are mounted in a U-shaped arm 67 which is arranged on the top plate 54 to swing about an axis 69—69 at right angles to the top plate. Owing to the arm, and to the telescoping connection of the control shafts and their extensions, the control mechanism can adapt itself to all positions of the lower slide 48, and the driving shafts 46, 51, transversely to the axis of its shafts, as indicated by the arrowed arcs 85 about the axis 69—69, and longitudinally, as indicated by the arrows 86.

Mounted in a bearing at the upper end of the swinging arm 67, with their axis in the axis 69—69 the arm swings about, are a solid control-operating shaft 74, and a hollow control-operating shaft 75 surrounding co-axially the solid shaft 74. A pair of bevel gears 71', 71'' connect the solid control shaft extension 59' and the solid control-operating shaft 74, and a pair of bevel gears 76', 76 connect the hollow control-shaft 60' and the hollow control-operating shaft 75. The hand wheels can now be placed directly on the shafts 74 and 75, or, if it is desired for selecting the most favorable conditions, extra hand wheel shafts for the hand wheels 57 and 58 are mounted to rotate in bearings on the top plate 54, or at the sides of the box 1, and connected to the control-operating shafts 74, 75, or the shafts 74', 75', connected therewith by an other bevel gear transmission, respectively by bevel gearings 78', 78'' and 77', 77''.

It will be understood from what has been said that it is not easy to provide a suitable control for the slides 48 and 41, in view of the fact that the slides not only move in straight lines but at the same time are turned by the rotatable members. Flexible shafts are not suitable as their angular velocities are not equal and so it is very difficult for the operator to effect a precise adjustment since he cannot estimate the movement of a slide which will be produced by turning the corresponding hand wheel through a given angle. This difficulty is eliminated by the construction which has been described and which permits of arranging the hand wheels in fixed positions where they are most conveniently accessible to the operator, and at the same time provides for uniform and exact adjustment of the slides.

A particularly favorable feature of the units illustrated in Figs. 4 and 5 is that the parts for shifting the slides 41 and 48 are housed in cavities of the slides themselves and of the rotary members where they are protected against chips, dirt, and damage.

We claim:

1. In a machine tool, means for holding a cutting tool and a work piece, a top plate forming part of the machine tool, a hollow lower rotary member, a spigot on the lower rotary member arranged to turn in a hole in the top plate, a lower slide mounted to slide on the lower member, a spindle for shifting this slide on the lower member, an upper rotary member mounted to rotate on the lower slide, an upper slide to which one of the parts is secured and which is mounted to slide on the upper rotary member, a spindle for shifting the slide on the upper member, a solid and a hollow driving shaft mounted to rotate on the lower slide in co-axial relation to the upper rotary member and to each other and projecting into the cavity of the lower rotary member with a clearance, means on one of the driving shafts for rotating one of the spindles, means on the other driving shaft for rotating the other spindle, means for rotating each driving shaft, means for illuminating the tool and the work piece at the point where they engage, means for magnifying the shadow image of the profiles of the tool and the work piece which is produced by such illumination at said point, a screen, means for projecting the magnified image against the screen, and a diagram of the profiles on the screen.

2. In a machine tool, means for holding a cutting tool and a work piece, a top plate forming part of the machine tool, a hollow lower rotary member, a spigot on the lower rotary member arranged to turn in a hole in the top plate, a lower slide mounted to slide on the lower member, a spindle for shifting the slide on the lower member, an upper rotary member mounted to rotate on the lower slide, an upper slide to which one of the parts is secured and which is mounted to slide on the upper rotary member, a spindle for shifting this slide on the upper member, a solid and a hollow driving shaft mounted to rotate on the lower slide in co-axial relation to the upper rotary member and to each other and projecting into the cavity of the lower rotary member with a clearance, means on one of the driving shafts for rotating one of the spindles, means on the other driving shaft for rotating the other spindle, a control shaft operatively connected to each driving shaft, a bearing bracket mounted to swing about the hollow driving shaft for supporting the control shafts, means for rotating each control shaft, means for illuminating the tool and the work piece at the point where they engage, means for magnifying the shadow image of the profiles of the tool and the work piece which is projected by such illumination at said point, a screen, means for projecting the magnified image against the screen, and a diagram of the profiles on the screen.

3. In a machine tool, means for holding a cutting tool and a work piece, a top plate, forming part of the machine tool, a hollow lower rotary member, a spigot on the lower rotary member arranged to turn in a hole in the top plate, a lower slide mounted to slide on the lower member, a spindle for shifting this slide on the lower member, an upper rotary member mounted to rotate on the lower slide, an upper slide to which one of the parts is secured and which is mounted to slide on the upper rotary member, a spindle for shifting the slide on the upper member, a solid and a hollow driving shaft mounted to rotate on the lower slide in co-axial relation to the upper rotary member and to each other and projecting into the cavity of the lower rotary member with a clearance, means on one of the driving shafts for rotating one of the spindles, means on the other driving shaft for rotating the other spindle, a control shaft operatively connected to each driving shaft, the two control shafts being arranged co-axially one within the other, a bearing bracket mounted to swing about the hollow driving shaft for supporting the control shafts, means for rotating each control shaft, means on each control shaft for varying its length in conformity with the displacement of the driving shafts with the lower slide, means for illuminating the tool and the work piece at the point where they engage, means for magnifying the shadow image of the profiles of the tool and the work piece which is produced by such illumination at said point, a screen, means for projecting the magnified image against the screen, and a diagram of the profiles on the screen.

4. In a machine tool, means for holding a cutting tool and a work piece, a top plate forming part of the machine tool, a hollow lower rotary member, a spigot on the lower rotary member arranged to turn in a hole in the top plate, a lower slide mounted to slide on the lower member, a spindle for shifting this slide on the lower member, an upper rotary member mounted to rotate on the lower slide, an upper slide to which one of the parts is secured and which is mounted to slide on the upper rotary member, a spindle for shifting this slide on the upper member, a solid and a hollow driving shaft mounted to rotate on the lower slide in co-axial relation to the upper rotary member and to each other and projecting into the cavity of the lower rotary member with a clearance, means on one of the driving shafts for rotating one of the spindles, means on the other driving shaft for rotating the other spindle, a divided control shaft operatively connected to each driving shaft, telescope-like means connecting the parts of each control shaft, an arm mounted in the top plate to swing about an axis extending in parallel relation to the axis of the driving shafts, a bearing in the arm for the reception of one of the parts of each control shaft, a bearing bracket mounted to swing about the hollow driving shaft and partaking in its displacement with the lower slide, for the reception of the other part of each control shaft, means for rotating each control shaft, means for illuminating the tool, and the work piece at the point where they engage, means for magnifying the shadow image of the profiles of the tool and the work piece which is produced by such illumination at said point, a screen, means for projecting the magnified image against the screen, and a diagram of the profiles on the screen.

5. In a machine tool, means for holding a cutting tool and a work piece, a top plate forming part of the machine tool, a hollow lower rotary member, a spigot on the lower rotary member arranged to turn in a hole in the top plate, a lower slide mounted to slide on the lower member, a spindle for shifting this slide on the lower member, an upper rotary member mounted to rotate on the lower slide, an upper slide to which one of the parts is secured and which is mounted to slide on the upper rotary member, a spindle for shifting this slide on the upper member, a solid and a hollow driving shaft mounted to rotate on the lower slide in co-axial relation to the upper rotary member and to each other and projecting into the cavity of the lower rotary member with a clearance, means on one of the drying shafts for rotating one of the spindles, means on the other driving shaft for rotating the other spindle, a divided control shaft operatively connected to each driving shaft, telescope-like means connecting the parts of each control shaft, an arm mounted in the top plate to swing about an axis extending in parallel relation to the axis of the driving shafts, a bearing in the arm for the reception of one of the parts of each control shaft, a bearing bracket mounted to swing about the hollow driving shaft and partaking in its movement with the lower slide, for the reception of the other part of each control shaft, a control-operating shaft allotted to each control shaft, the two control shafts being arranged co-axially to the axis the arm swings about, and operatively connected to that part of the corresponding control shaft which is mounted in the bearing on the arm, a hand wheel mounted to rotate in a position which is fixed with respect to the top plate, for rotating each control-operating shaft, means for illuminating the tool and the work piece at the point where they engage, means for magnifying the shadow image of the profiles of the tool and the work piece which is produced by such illumination at said point, a screen, means for projecting the magnified image against the screen, and a diagram of the profiles on the screen.

ALFRED KOLB.
WILHELM WILK.